(12) United States Patent
Kaler et al.

(10) Patent No.: US 7,707,637 B2
(45) Date of Patent: *Apr. 27, 2010

(54) DISTRIBUTED THREAT MANAGEMENT

(75) Inventors: Christopher G. Kaler, Sammamiah, WA (US); Giovanni Moises Della-Libera, Seattle, WA (US); John P. Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 245 days.

This patent is subject to a terminal disclaimer.

(21) Appl. No.: 12/058,156

(22) Filed: Mar. 28, 2008

(65) Prior Publication Data

US 2009/0013410 A1    Jan. 8, 2009

Related U.S. Application Data

(62) Division of application No. 10/185,008, filed on Jul. 1, 2002, now Pat. No. 7,373,666.

(51) Int. Cl.
G06F 7/04 (2006.01)
G06F 11/30 (2006.01)
H04L 9/00 (2006.01)

(52) U.S. Cl. ............. 726/25; 726/2; 726/3; 726/4; 726/5; 726/6; 713/187; 713/188; 709/223; 709/224; 709/225

(58) Field of Classification Search ............. 726/25
See application file for complete search history.

(56) References Cited

U.S. PATENT DOCUMENTS 6,324,656 B1    11/2001 Gleichauf et al.
6,408,391 B1    6/2002 Huff et al.
2002/0007338 A1    1/2002 Do
2002/0073338 A1*    6/2002 Burrows et al. ............. 713/201
2002/0119427 A1*    8/2002 Brown et al. ................ 434/1
2003/0163706 A1*    8/2003 Cocchi et al. ............... 713/182

OTHER PUBLICATIONS

Box, Don. "A Brief History of Soap" (Apr. 4, 2001) xml.com : http://webservices.xml.com/pub/a/ws/2001/04/04/soap.html.

Barrus et al.; "A Distributed Autonomomous-Agent Network-Intrusion Detection and Response System". (Jun. 1998) NEC Research Index, Procedings of the 1998 Command and Control Research and Technology Symposium.

(Continued)

*Primary Examiner*—Longbit Chai
(74) *Attorney, Agent, or Firm*—Workman Nydegger

(57) ABSTRACT

A method and system are provided for managing a security threat in a distributed system. A distributed element of the system detects and reports suspicious activity to a threat management agent. The threat management agent determines whether an attack is taking place and deploys a countermeasure to the attack when the attack is determined to be taking place. Another method and system are also provided for managing a security threat in a distributed system. A threat management agent reviews reported suspicious activity including suspicious activity reported from at least one distributed element of the system, determines, based on the reports, whether a pattern characteristic of an attack occurred, and predicts when a next attack is likely to occur. Deployment of a countermeasure to the predicted next attack is directed in a time window based on when the next attack is predicted to occur.

22 Claims, 11 Drawing Sheets

OTHER PUBLICATIONS

P.A. Porras, P.G. Neumann. "EMERALD: Event Monitoring Enabling Responses to Anomalous Live Disturbances" (1997) Proc. 20th NIST-NCSC National Information Systems Security Conference.

E.A. Fisch "Intrustion Damage Control and Assessment: A Taxonomy and Implementation for Automated Responses to Intrusive Behavior" (May 1996) PhD Thesis, Texas A&M University. Chapters I-III.

The Honeynet Project Know Your Enemy: Statistics (Jul. 22, 2001). Available online at http://www.chguy.net/news/jul01/attack-stats,html.

J. Yuill, S.F. Wu, F. Gong, M. Huang. "Intrusion Detection for an On-Going Attack" (1999) Recent Advances in Intrusion Detection.

* cited by examiner

DISTRIBUTED THREAT MANAGEMENT

This application is a Continuation of application Ser. No. 10/185,008 filed on Jul. 1, 2002 now U.S. Pat. No. 7,373,666, and for which priority is claimed under 35 U.S.C. §120; the entire contents of all are hereby incorporated by reference.

FIELD OF THE INVENTION

The present invention relates to a threat management system used with computers, and methods for managing threat in a system of computer devices. More specifically, the invention relates to distributed threat management in a system of distributed computer devices.

BACKGROUND OF THE INVENTION

Current threat management systems are focused on blocking "bad" requests on a specific level (e.g., firewalls, operating systems, applications, routers, etc.). Generally, today's systems do not coordinate threat management activities across different applications, stack levels, or across distributed systems.

Most systems monitor activity only in a single or a very limited number of elements in a system. For example, a system may determine that a threat exists if a particular number of connection requests are received in a given amount of time. Some specific detection systems determine that a threat exists based on occurrences of only a very specific type of suspicious activity occurring in one or more elements of the system. However, current threat management systems do not generally detect the occurrence of suspicious activity in more than one element of a system and, based on the occurrence of that activity in the system, determine that a threat exists. For example, if a threat is determined when 8 attacks occur, if system A detects 4 attacks and system B detects 4 attacks, then because no single element of the system detects 8 attacks, no threat is determined. Further, when an element determines that a threat exists, countermeasures are deployed within that element, but other portions of the system may still be subject to attack. In summary, there is no system that allows a general correlation of activities in multiple elements of the system to detect threats and a coordinated deployment of countermeasures among the multiple elements to mitigate the detected.

BRIEF SUMMARY OF THE INVENTION

The present invention addresses the above situation by providing a system that detects a threat in a distributed manner and coordinates a countermeasure to the threat. One or more threat management agents may be integrated with other devices or may be in separate devices. Distributed threat detection sources notify one of the threat management agents when a threat is detected. The threat management agent may determine a level of the threat based on a frequency of occurrence of the threat or a severity of the threat and may direct deployment of a countermeasure. Thus, an element of a prior art system may implement a countermeasure when, for example, 8 suspected attacks are detected by the element, while the present invention would deploy a countermeasure when, for example, 8 suspected attacks are detected within the distributed system (i.e., the suspected attacks are not limited to being detected by a single element). The present invention may also provide protection to areas of a distributed system against future attacks. A threat management agent may be configured to review a threat management log and may predict a next attack based on activity recorded in the log. Countermeasures may be deployed within a time window near a time of the predicted next attack.

The invention may be applied to multiple types of attacks against different elements of a single or distributed system as well as a single type of attack against elements of a distributed system. Similarly, the deployment of countermeasures may be directed to the particular element or elements under attack or may be directed to other elements to reduce or eliminate the impact of the attacks.

BRIEF DESCRIPTION OF THE DRAWINGS

The present invention is described with respect to the accompanying figures, in which like reference numerals identify like elements, and in which.

DETAILED DESCRIPTION

Operating Environment

Aspects of the present invention are suitable for use in a variety of distributed computing system environments. In distributed computing environments, tasks may be performed by remote computer devices that are linked through communications networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, network PCS, minicomputers, mainframe computers, and the like.

The invention will be described in the general context of computer-executable instructions, such as program modules, that are executed by a personal computer or a server. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
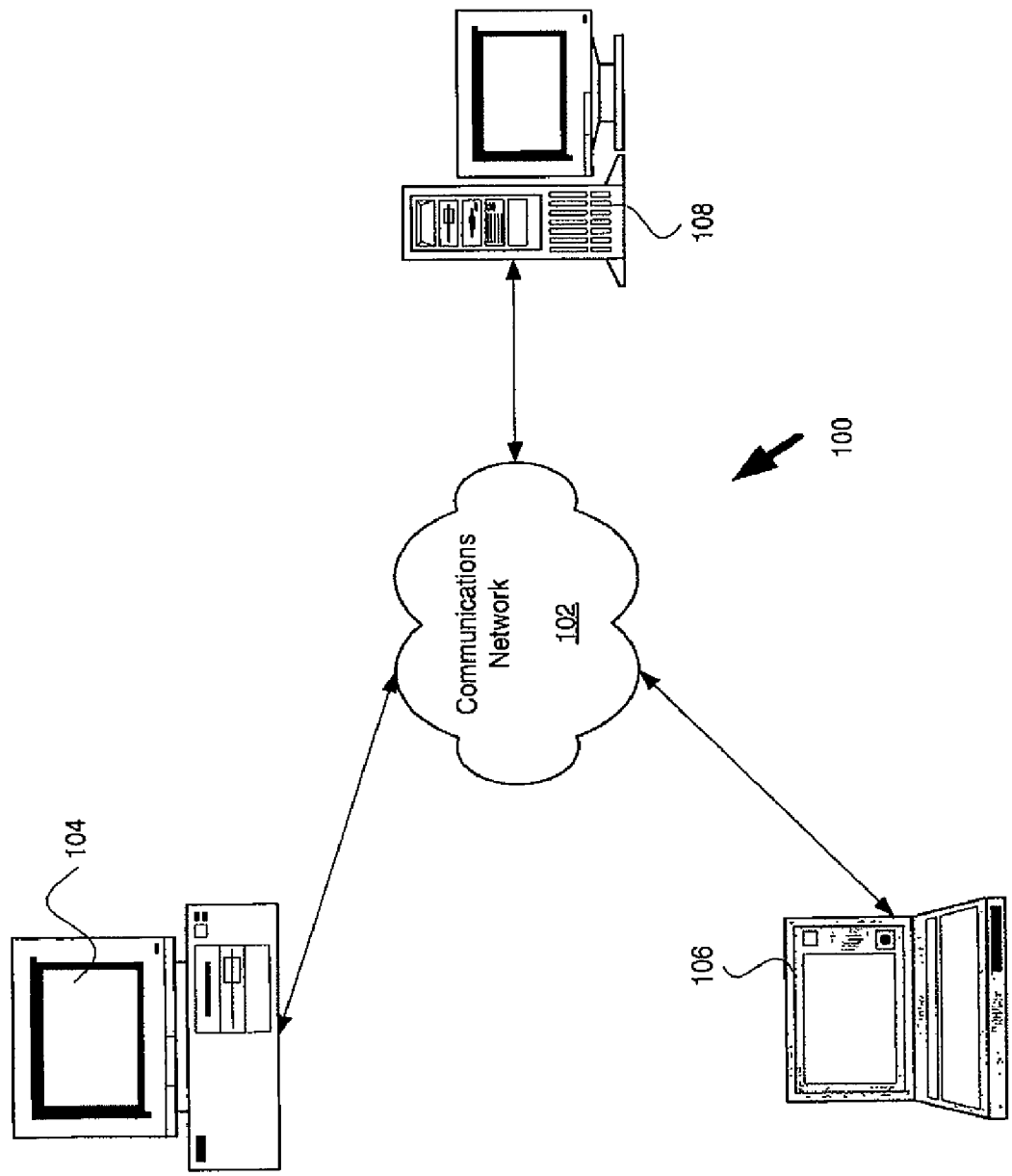
FIG. 1 illustrates an exemplary distributed computing system operating environment.

FIG. 1 illustrates an example of a suitable distributed computing system 100 operating environment in which the invention may be implemented. Distributed computing system 100 is only one example of a suitable operating environment and is not intended to suggest any limitation as to the scope of use or functionality of the invention. System 100 is shown as including a communications network 102. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services such as Microsoft7 Network. Systems may also include more than one communication network, such as a LAN coupled to the Internet Computer device 104, computer device 106 and computer device 108 may be coupled to communications network 102 through communication devices. Network interfaces or adapters may be used to connect computer devices 104, 106 and 108 to a LAN. When communications network 102 includes a WAN, modems or other means for establishing a communications over WANs may be utilized. Computer devices 104, 106 and 108 may communicate with one another via communication network 102 in ways that are well known in the art. The existence of any of various well-known protocols, such as TCP/IP, Ethernet, FTP, HTTP and the like, is presumed.

Computers devices 104, 106 and 108 may exchange content, applications, messages and other objects via communications network 102.

Figure 2:
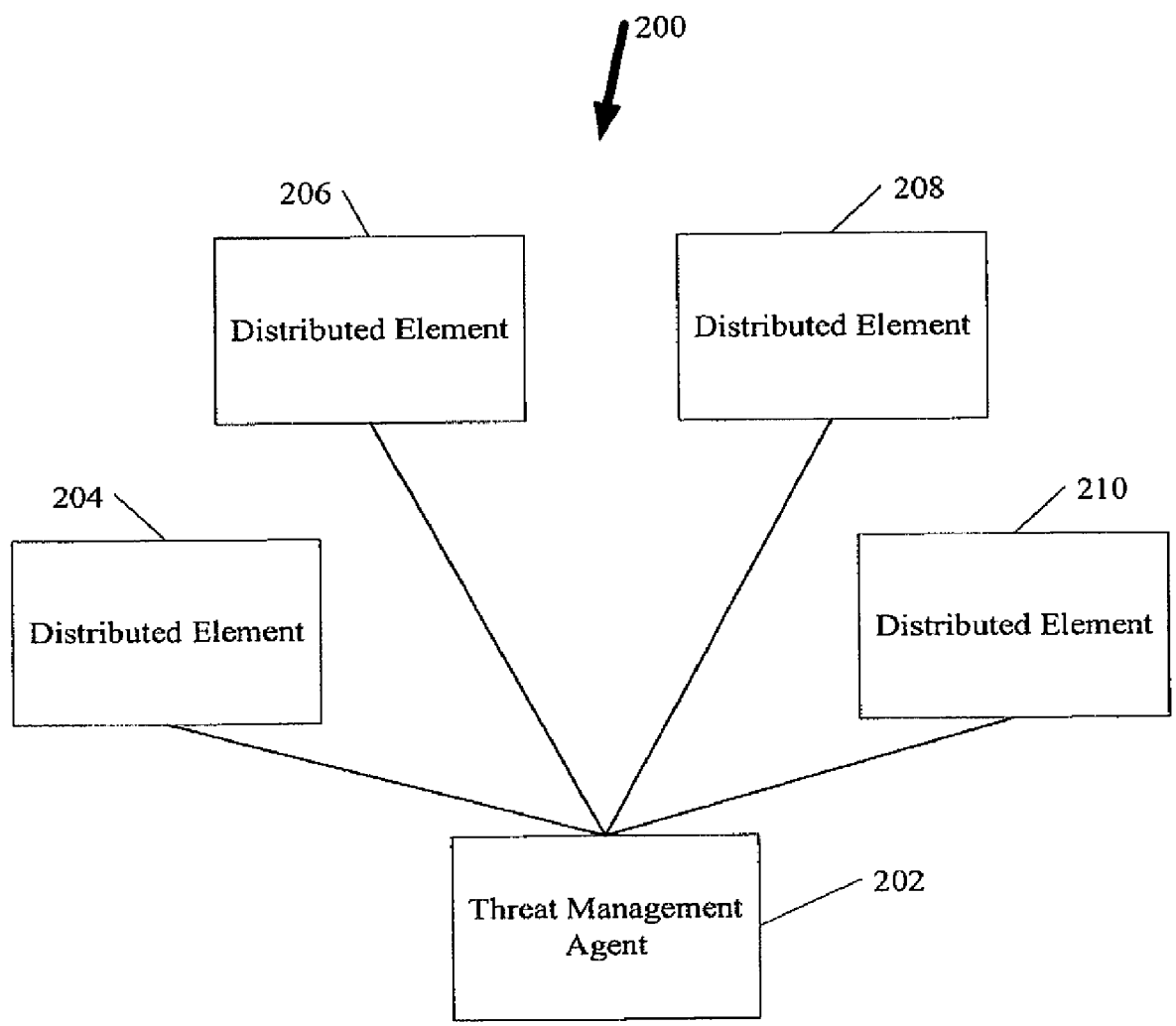
FIG. 2 is a block diagram of an exemplary embodiment of a threat management system.

FIG. 2 is a block diagram illustrating an embodiment of the invention shown as threat management system 200 including a threat management agent 202 and distributed elements 204-210. Threat management agent 202 and distributed elements 204-210 may be in separate devices, such as, for example, computer devices 104, 106 and 108 as shown in FIG. 1, distributed within a network, they may be physically located within the same device, such as, for example, different elements or parts of a single system, or some distributed elements may be located in the same physical device with other elements or with the threat management agent while other elements may be in physically separate devices connected through a network. Further, an embodiment of the invention may include multiple threat management agents to receive reports from at least some of the same system components. Such a configuration may provide failover support or may provide detection for different types of threats.

Figure 3:
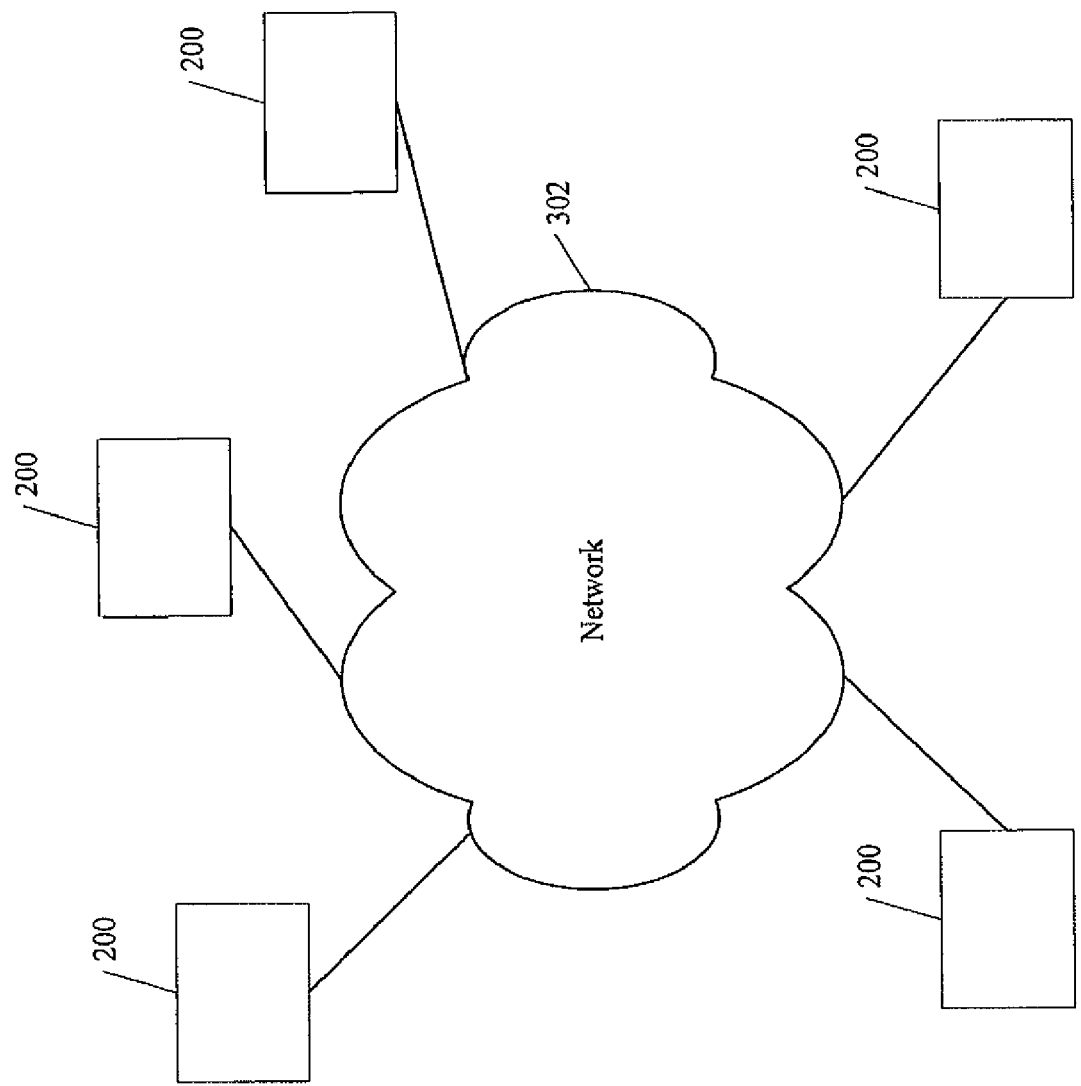
FIG. 3 is a network diagram illustrating an exemplary configuration that may be used with an embodiment of the invention.

FIG. 3 is a network diagram showing another exemplary embodiment of the invention. The configuration includes a plurality of threat management systems 200. Each threat management system includes a threat management agent and may include one or more distributed elements 204-210. The threat management agent and each of the distributed elements may be in a separate physical device communicating with the threat management system either directly or via network 300. Further the threat management agent may be combined with one or more distributed elements in a physical device. Each of the threat management agents may be configured to communicate with other threat management agents via one or more networks 302.

Exemplary Attacks

Many different types of attacks may be made against systems. One well-known attack is the Denial-of Service (DOS) attack. This type of attack is intended to overwhelm, for example, a server such that the server cannot service any other requests, effectively denying service.

Figure 4A:
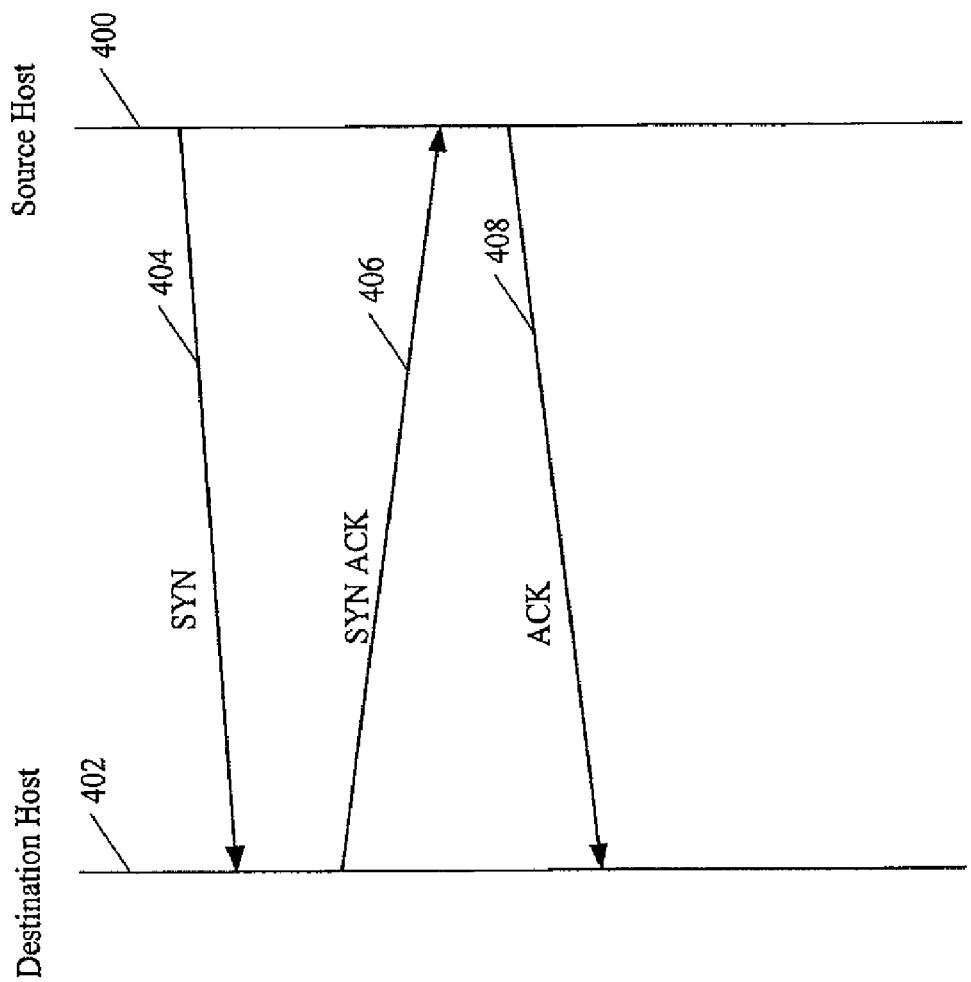
FIGS. 4A-4B are data communication diagrams illustrating a SYN/ACK Denial Of Service attack.
Figure 4B:
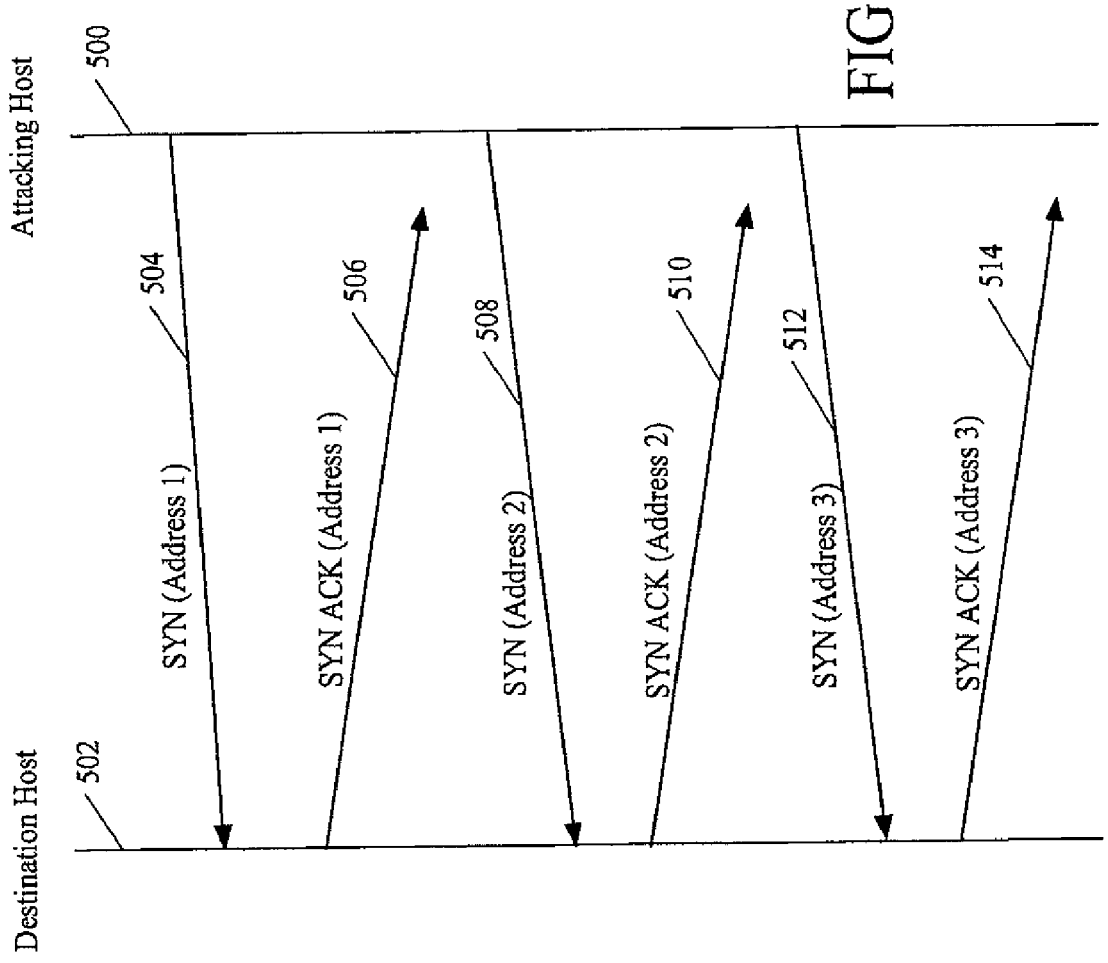

One well-known example of a DOS attack is the SYN/ACK attack, as illustrated in FIGS. 4A-4B. Under normal conditions, source host 400 sends a SYN 404 to destination host 402 to request a Transaction Control Protocol (TCP) connection. Destination host 402 sends a SYN ACK 406 to source host 400 acknowledging receipt of the SYN and allocates resources, such as connection control blocks to be used to keep track of the TCP connection. At 408, source host sends an ACK message to indicate that the SYN ACK has been received and that the connection setup is completed.

FIG. 4B illustrates an exemplary SYN/ACK attack. Attacking host 500 sends a SYN message with an invalid address (address 1) or, perhaps, someone else's address to destination host 502 to request a TCP connection. At 506, destination host 502 responds with a SYN ACK message to acknowledge receipt of the SYN message. Because the SYN ACK message is addressed to an invalid address or someone else's address, an ACK message will most likely not be received. Therefore, resources are tied up until the connection setup times out, possibly for as long as one minute or longer. Meanwhile, attacking host 500 send another SYN message, at 508, with another invalid address (address 2) or another party's address. At 510, destination host 502 responds with a SYN ACK that is addressed to an address 2. Thus, additional resources are tied up for another timeout period. At 512 and 513, the behavior repeats with a third address. If this behavior continually repeats, eventually, destination host 502 will run out of resources and newly requested resources are denied.

Several strategies exist for providing a counterattack to the SYN/ACK attack. One possible solution is to shorten the timeout period during which the destination host waits for an ACK message. For example, instead of waiting for a one minute period, the timeout period may be set to 2 seconds.

An alternative solution is for the destination host not to assign resources to a TCP connection until after an ACK message is received. Other alternatives include blacklisting the address for a time period or blacklisting the router that sent the SYN packet to the destination host.

Another type of attack is fragmentation. That is, specifically dividing packets and exploiting potential weaknesses in re-assembly and processing logic. One example of this is an Internet Protocol (IP) fragmentation attack. When transmitting over small or congested networks, IP packets can be fragmented, or broken into multiple small packets for transmission over such networks. If the packets are fragmented, such that they are very small, intrusion detection systems and routers may be unable to identify the packets' contents or may be fooled in some way and will let the packets through without detecting a problem. When a packet is reassembled at the destination, an error may occur which causes the computer to reboot or hang. Commonly, the attack focuses on a particular implementation or, more specifically, on an error in a particular implementation. For example, the fragmentation attack may be designed to exploit a particular bug in a particular implementation of the IP protocol stack. In general, the particular type of error that occurs depends upon the implementation of the IP protocol.

A solution to the fragmentation attack is to detect packet shape patterns and discard atypical or suspect packets when they are received. Once sources of potential attacks are detected, packets from that source might be ignored for a period of time as a possible attack mitigation.

Distributed Threat Management

Figure 5:
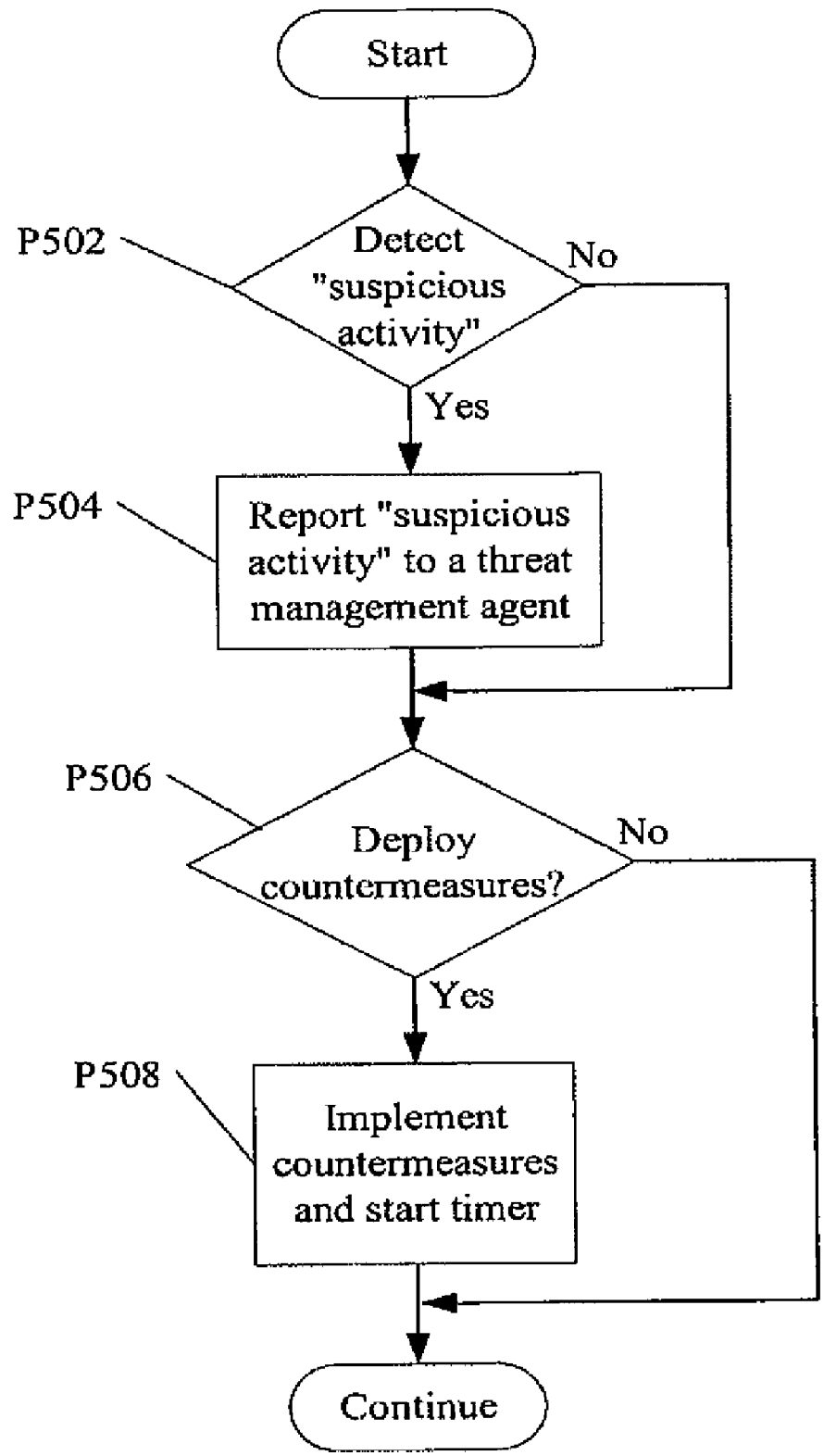
FIG. 5 is a flowchart illustrating processing within a distributed element in an exemplary embodiment of the invention.
Figure 6:
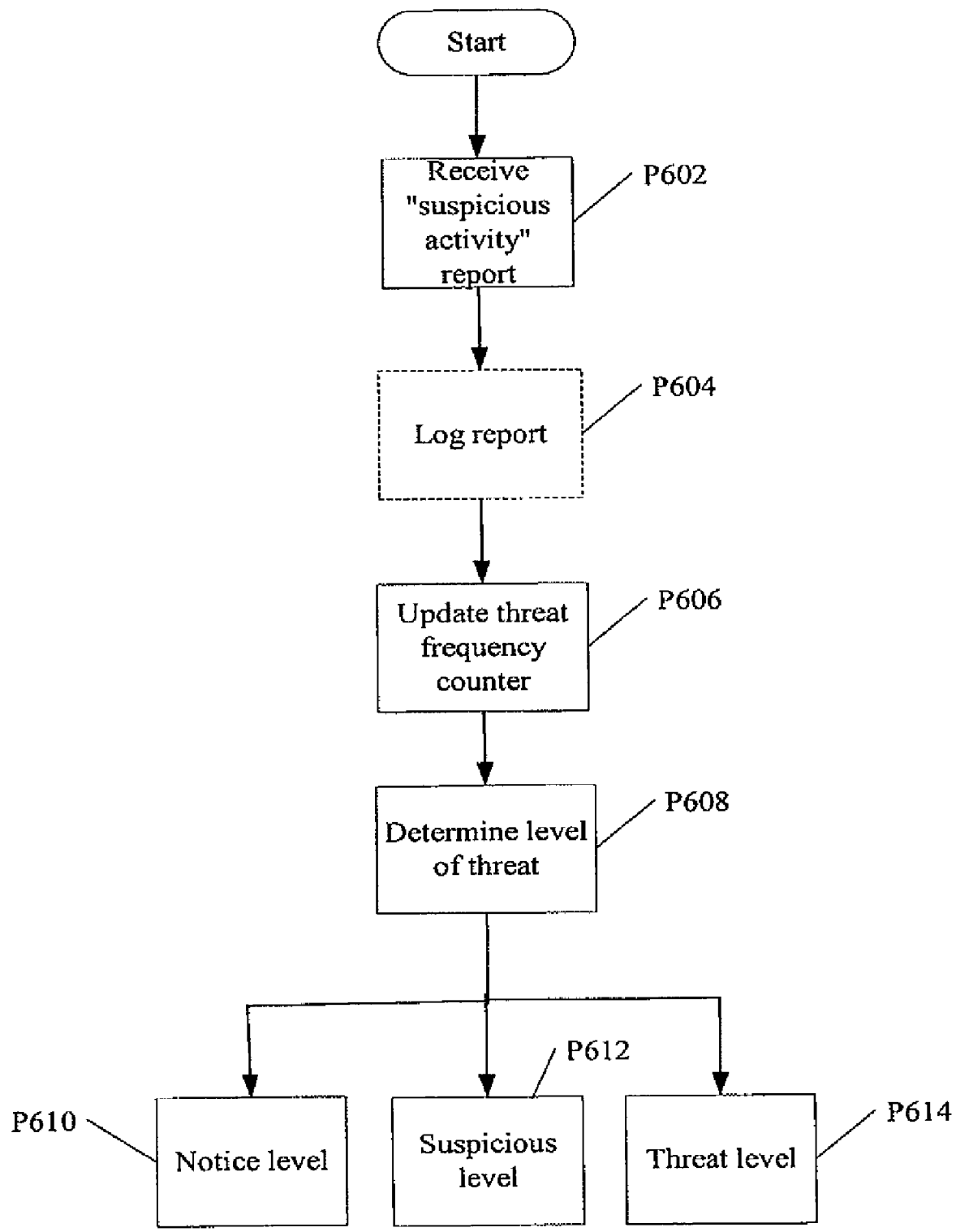
FIGS. 6-8 are flowcharts illustrating processing within an exemplary threat management agent.

FIGS. 5 and 6 illustrate the processing within an exemplary system for distributed threat management. FIG. 5 is directed to processing within threat sources, such as, for example, distributed elements within the system and FIG. 6 is directed to processing within a threat management agent.

With reference to FIG. 5, at P502, a threat source detects suspicious activity. The suspicious activity may include a SYN/ACK attack, an IP fragmentation attack, or any other type of attack. Suspicious activity may also include behavior which may later be determined not to be part of an attack, but is considered to be suspicious because it is a type of behavior generally associated with an attack. If suspicious activity is detected, then at P504, the threat source reports suspicious activity to a threat management agent. The report may include the type of attack suspected, i.e., SYN/ACK attack or IP fragmentation attack or other types of attack, and may also include other information such as address information regarding a source of the attack or a time of the day and date of the attack.

At P506, a check is made to determine whether a deploy countermeasure message was received by a threat management agent. If such a message was received, then at P508, countermeasures for the suspected attack are implemented and a timer may be started, such that the countermeasures will be implemented during a period of time that the timer is running. The time period may be predefined in the threat source or the time period may be indicated in the deploy countermeasure message sent from the threat management agent. The time period may be based on a severity of the threat. For example, an unauthorized attempt to access a resource might result in a ten minute period of blocking requests to access the resource, while an unauthorized attempt to access a classified document might result a ten day period of being blocking requests to access the document. The time period may further be based on a frequency of the suspicious activity. For example, access may be blocked for five minutes after a third password failure and for one hour after a sixth password failure.

Alternatively, the time period may be based on a decay sequence. For example, when suspicious activity is reported for an IP address, a counter, which decays over time, may be incremented. When the counter is greater than a specific value, access may be limited or refused. Thus, if frequent suspicious activity is reported for the IP address, access will be limited or refused for a longer period of time.

As a further alternative, there may be some instances that the countermeasures should be deployed permanently or at least deployed until specifically removed. In these instances, there may not be a timer or decay sequence associated with the countermeasure. Removal of a countermeasure deployed without a timer or decay sequence may be accomplished in a variety of ways. As one example, the message deploying the countermeasure may specify what event should be used to signal removal of the countermeasure. As another example, the countermeasure may be specifically encoded to respond to a designated event and request its own removal. As yet a further example, removal may require a specific remove countermeasure message to be received. This may be useful, for example, in embodiments that use the threat management agent or another component or element to identify when countermeasures should be removed. Effectively, any event may be used to trigger removal of a countermeasure, including requiring intervention by another system, a system administrator or other user.

With reference to FIG. 6, processing in an embodiment of a threat management agent is described. At P602, the threat management agent receives a suspicious activity report originating from a threat source. The report may be in any form including, by way of example and not limitation, an event notification, a message sent via a point to point connection from the threat source, an Extensible Markup Language (XML) document sent via a transport connection, a shared memory or data store accessible by both the threat management agent and the entity sending or forwarding the report, through some messaging mechanism, such as the Simple Object Access Protocol (SOAP) or Remote Method Invocation (RMI) or any other form.

At P604, optionally, the report or suspicious activity may be persisted in a log, which may be maintained in volatile and/or non-volatile storage.

At P606, a metric indicating the relative occurrence of the threat is updated. Such a metric can include, without limitation, a threat frequency counter which is updated according to defined methodology, a rate counter, or some other metric that either reflects the relative occurrence of the threat or allows the relative occurrence to be inferred. The threat frequency counter may be incremented and decremented according to a given set of logic in order to infer the relative occurrence of the activity. As another example, the system may monitor a rate of occurrence of suspicious activity. In such embodiments, a level of detected threat mat be set based on the detected rate. For example, a threat level may be reached if a specific number of occurrences of suspicious activity are detected within a specific time period. Other types of metrics may also be used to indicate the relative occurrence of the activity or threat. A single threat metric may be maintained to keep track of any type of reported threat or a separate threat metrics may be maintained for each type of threat detected.

At P608, the threat metric, or each threat metric, if a plurality of threat metrics are maintained for each type of threat detected, are checked to determine the current level of threat. This check necessarily involves encoding various decision points (which may be hard or soft) into the check so that one or more threat levels may be identified. For example, assuming an embodiment uses a threat frequency counter as a threat metric, once a threat frequency counter is greater than zero, but less than four, a notice level might be in effect. If a threat frequency counter is four or greater, but less than eight, a suspicious level of threat might be in effect. If a threat frequency counter is eight or greater, then a current threat level might be in effect. Each of the different levels of threat may have a different action associated with the level of threat. For example, in this example, no action may be associated with the notice level of threat, while the suspicious level may trigger a notice to the system administrator and a threat level may trigger both a notice and automatic deployment of countermeasures. Any number of levels may be used and different embodiments may allow the levels to be customized or programmatically determined.

In addition to evaluating multiple threats independently, the threats from multiple metrics may be correlated according to some logic in order to pick out threats that may otherwise go unnoticed. For example, the metrics measuring SYN/ACK and fragmentation activity may be correlated to identify whether an attack is taking place, to identify the threat level, and, as indicated below, to make decisions on what countermeasures to deploy to respond to the attacks. In this sense, the ultimate level or levels identified may be a function of multiple levels for different threats or code that evaluate different levels and settings in order to make an assessment.

Figure 7:
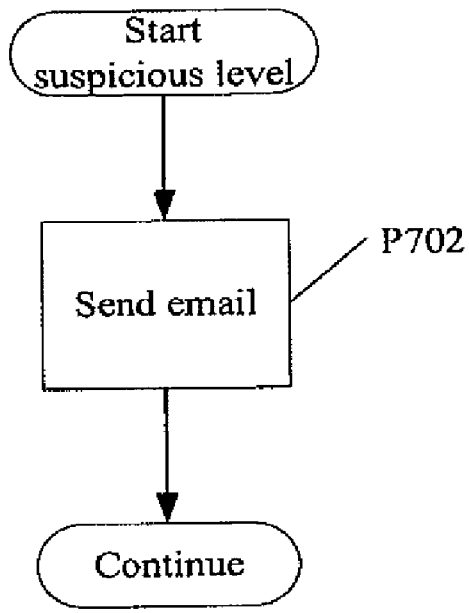

With reference to FIG. 7, when a suspicious activity report is received, and a suspicious level of threat is reached, at P702, e-mail, or other notification, may be sent to a designated system, system administrator, system security personnel or any other designated party. Other embodiments may provide notification of a threat via other means. For example, means of providing a notification include, but are not limited to, sending the notification via an instant messaging mechanism, via a pager, a phone call, an alarm, posting on the console, lighting a light on a panel, or executing a program to send notification or any other type of notification. Multiple methods of notification may be used, either at one time (e.g. post to the console and send email) or in an escalating fashion (e.g. post to the console, if no reply, page, if no reply, call the administrator at home). In addition, notifications may be sent to multiple systems or parties either all at once, or in an escalating fashion (e.g. send to the assistant system administrator and if no response, then to the system administrator).

Figure 8:
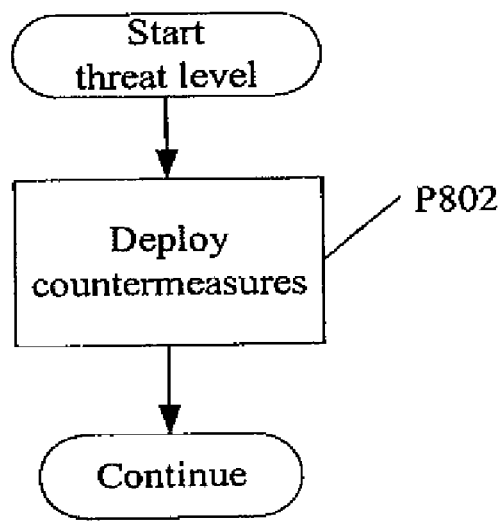

With reference to FIG. 8, an exemplary procedure is explained with regard to the activity that occurs when threat level has been reached. At P802, countermeasures are deployed. In addition, as indicated in FIG. 7, notification may also be sent to one or more systems or individuals that the threat level has been reached and countermeasures are to be deployed. Such notification may also identify the particular countermeasures that are to be deployed.

To deploy countermeasures, the threat management agent may send a deploy countermeasure message to distributed elements directing the one or more of the elements to implement countermeasures according to a suspected attack, as indicated in the deploy countermeasures message. The deploy countermeasures message may further include a time period during which the countermeasures should be implemented, or other indication as to the event that should trigger removal of the countermeasure, if any. The deploy countermeasures message may be sent to the elements via a number of methods, including, but not limited to, a point-to-point connection, broadcast message, an event notification mechanism, or any other method.

Alternatively, the threat management agent may coordinate deployment of countermeasures by sending a deploy countermeasures message to other threat management agents, if other threat management agents exist, such that the other threat management agents distribute the deploy countermeasures message to at least selected ones of the distributed elements. Further, the countermeasures may include distributing a blacklist to a number of elements within the distributed system. Such a blacklist may be distributed as part of the deploy countermeasures message or may be included in a separate message.

As inferred above, when a threat (or multiple threats) are detected, a decision must be made on how to respond. The type of response, and the particular package of countermeasures deployed, may be made on the basis of logic, with or without human intervention. For example, a system administrator may have multiple ways of responding to a SYN/ACK attack, depending on the exact nature and severity of the attack. One response might be to shorten the timeout for resources. Another might be to blacklist a particular router or message source. Another might be to employ both the previous countermeasures. Yet another might be to deploy the first and continually monitor for more routers that are added to a short term blacklist. Still another might be to totally take the system offline for a designated period of time. The system administrator may set up rules for when the various countermeasure options might be deployed. For example, the threat management agent may be instructed to deploy different countermeasures depending on the severity of the attack. Alternatively, the countermeasures may be deployed in combinations or in an increasing fashion (try one, if it solves the problem stop, if not try another, etc.).

Countermeasures may take multiple forms. By way of example, and not limitation, countermeasures may take the form of adjusting or altering one or more system parameters, such as reducing the timeout in a SYN/ACK attack, or modifying the operation of the system in some fashion, such as taking it offline for a while, refusing to accept new connections, or the like. In these types of countermeasures it may be sufficient to adjust system settings, parameters or operational behavior. As another example, countermeasures may include deploying executable code, either to replace or modify system code, to augment the functionality of system code in some fashion or to provide totally new functionality either in the system or outside the system. As a further example, a new processing condition may be defined and action taken in accordance with that condition. For example, when a SYN/ACK attack is suspected, such that when a third SYN is received from a particular subnet, the third SYN is ignored unless the third SYN is from a specific address. This could be expressed in code or in some other representation that is processed by the components or their threat management agents. As yet a further example, deploying countermeasures may require modifying the behavior of elements or components not part of the system. For example, the countermeasure may involve modifying the behavior of a router that is not part of the system to quit forwarding requests from a certain source, contacting other threat management agents to have them deploy countermeasures in their area of responsibility, contacting system administrators of other systems to deploy countermeasures on their systems or the like.

Executable code can take many forms. For example, it can take the form of traditional compiled code that is deployed either as system code, is utilized by system code, or executes independently of the system code. Often this type of code is written in a high level language that is then compiled into binary code, either in the form of a library, executable code modules, or executable applications or the like. However, executable code can take other forms as well. For example, the code may be written in a high level language like C#, Java, or the like and then compiled to an intermediate code form, such as Microsoft Intermediate Language (MSIL), Java Bytecodes or another intermediate language representation. This intermediate language representation is then executed in some type of run time environment like the Microsoft .NET Framework or a Java Virtual Machine (JVM). Similarly, the code may take the form of script, like ECMAScript, Python, Pearl or the like, which is executed by a script engine. Further, the code may be developed in a Common Language Runtime (CLR) environment.

When countermeasures are deployed, they may also participate in the ongoing monitoring of the threat and the threat response. Thus, it is possible to have them feed information into either the distributed element or the threat management agent, in order to provide additional sources of information that may be useful in assessing and responding to the threat, but may not otherwise be available to the threat management agent.

How countermeasures are deployed will depend on the specifics of the countermeasures For example, if the countermeasure involves adjusting system parameters or behavior, and the agent resides on the machine where the adjustment needs to be made, the agent may be able to simply make the adjustment or request the operating system or another system component make the adjustment. If the adjustments are to be made remotely, then some mechanism of remote administration or a remote request may be used. If countermeasures require that executable code be deployed, then the code may be activated or started if on the local machine directly, or if remote, through some other remote mechanism, such as using a remote procedure call (RPC) of some type, through some messaging mechanism, such as the Simple Object Access Protocol (SOAP) or Remote Method Invocation (RMI), through direct request that the system administrator or other individual intervention, or any other appropriate mechanism. It is not possible to identify all the ways and mechanisms that systems can be administered and/or code deployed in this patent application. However, those skilled in the art will recognize that when the specific countermeasure has been identified, there are well defined mechanisms for deploying that class of countermeasures.

Figure 9:
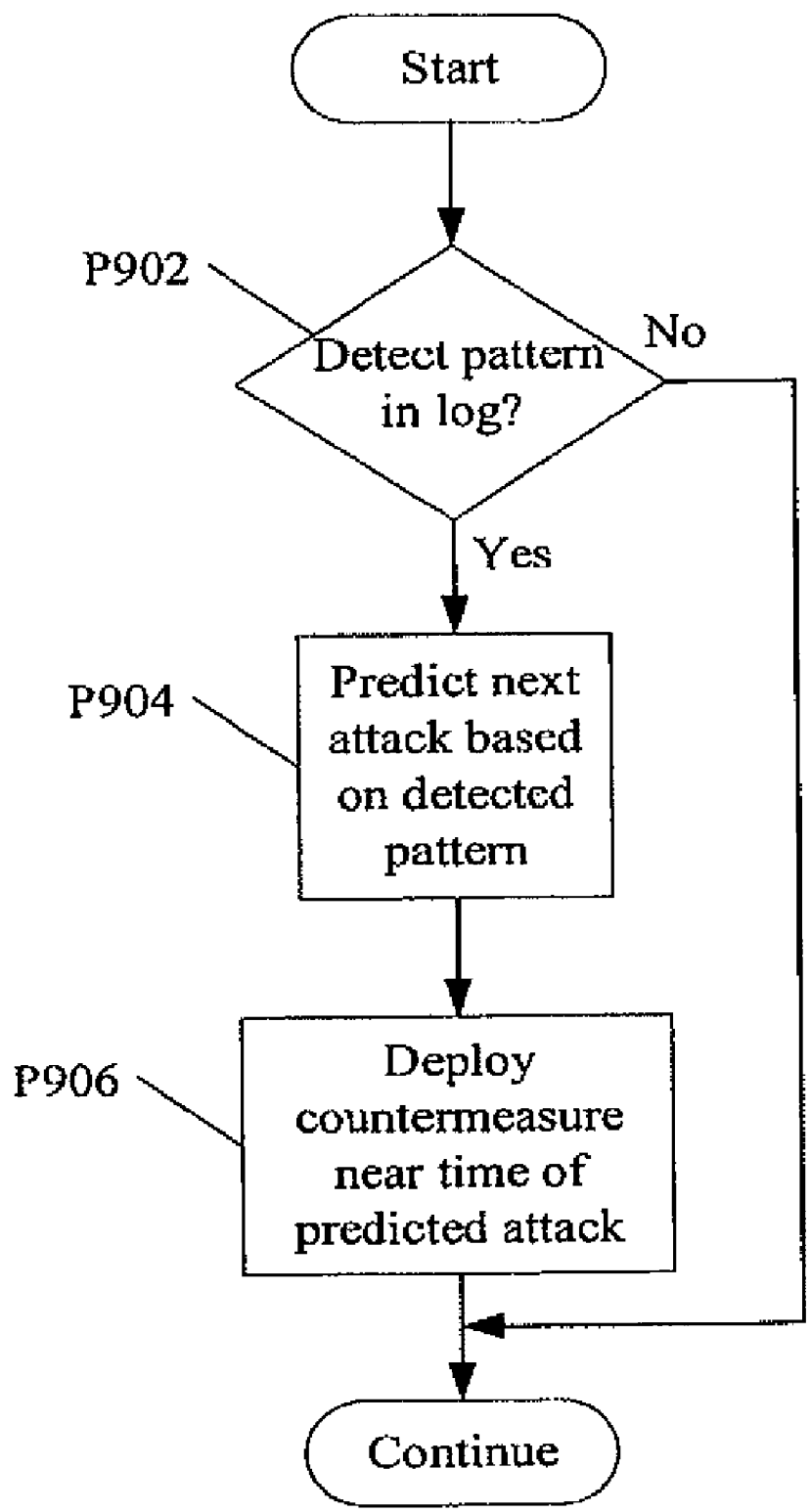
FIG. 9 is a flowchart illustrating processing within in another exemplary threat management agent.

With reference to FIG. 9, processing with an exemplary embodiment of a threat management agent is explained. At P902, the threat management agent inspects a threat detection log looking for patterns of suspected attacks. For example, the threat management agent may determine that a suspected SYN/ACK attack has occurred between 3 PM and 5 PM for the previous three days.

Alternatively, instead of or in addition to analyzing a threat detection log, the threat management agent may analyze reports of suspicious activity in real-time to help predict future attacks as described below. Alternatively, or in addition, analyzing the log either in real time or in a post processing fashion may be used either to supplement or confirm the metrics previously discussed or to replace the metrics when identifying certain types of attacks. In such instances, all the discussion above regarding identifying threat levels, selecting appropriate responses, including identifying and deploying countermeasures, fully apply.

At P904, the threat management agent predicts when a next attack will occur based on a detected pattern. For example, if the suspected SYN/ACK attack is detected, as mentioned above, then the threat management agent may predict a SYN/ACK attack to occur between 3 PM and 5 PM of the current date.

When a predicted attack has been identified, at P906, the threat management agent will issue deploy countermeasure messages near the time of the predicted attack to prepare for the attack. For example, using the above suspected SYN/ACK attack, the threat management agent may issue a deploy countermeasure message at 2:55 PM such that countermeasures should be implemented for 2 hours and 30 minutes. As explained with reference to FIG. 8, the deploy countermeasures message may be sent to distributed elements or to other threat management agents for distribution. Further, the deploy countermeasure messages may be sent via point-to-point connections, via an event notification mechanism, or via a transport connection, as well as other well-known mechanisms. Further, the deploy countermeasure messages may be distributed to all machines within a farm. All the discussion above about identifying the threat level, determining an appropriate response, and taking appropriate action, including deploying countermeasures, fully apply.

Figure 10:
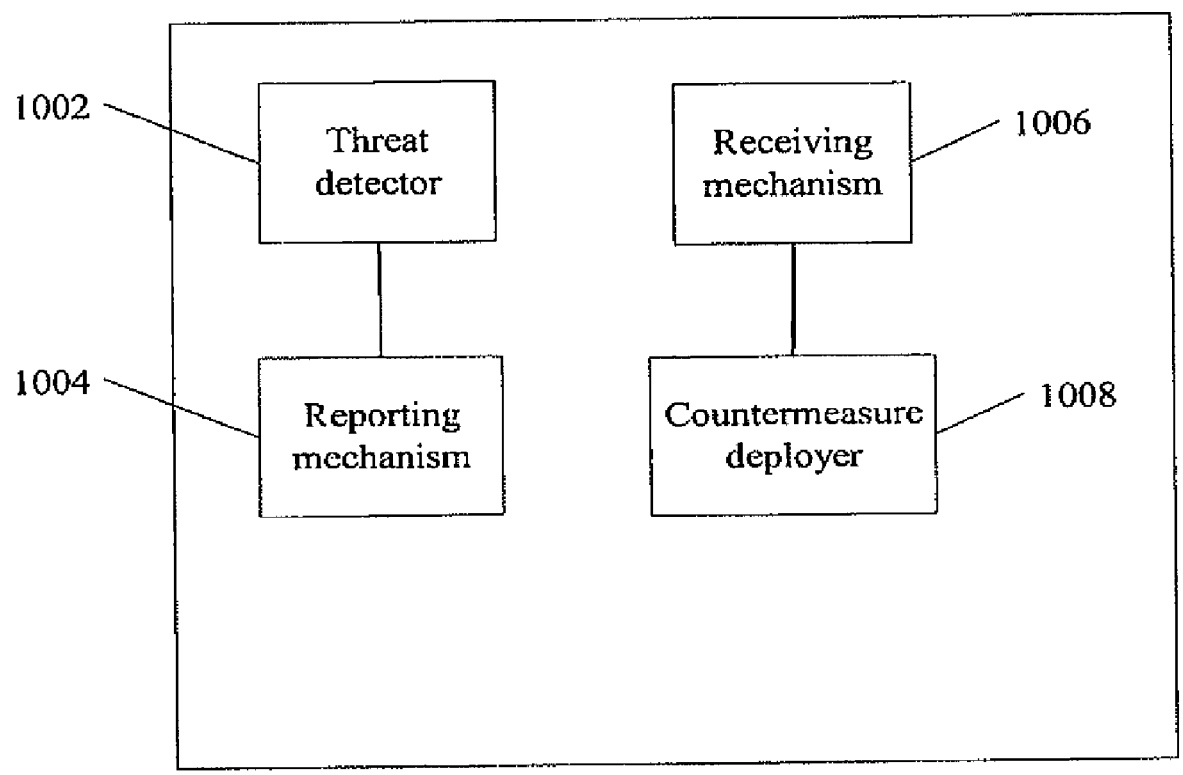
FIG. 10 is a block diagram of the exemplary distributed element of FIG. 5.

FIG. 10 is a functional block diagram of an embodiment of a distributed element. Threat detector 1002 monitors received communications for suspicious activity. There may be more than one threat detector and they may be distributed throughout various portions of the system, such as the application stack, so that various types of threats may be detected. By the term "application stack" we are referring to a composite stack comprising the application servers' stacks between the network/operating system and the application. The applications may be using services/libraries which have their own stacks.

Reporting mechanism 1004 constructs a suspicious activity report based on the threat detected by threat detector 1002. The reporting mechanism 1004 sends the suspicious activity report to a threat management agent, which may be included within the same physical device as the distributed element or may be included in a separate physical device remotely located from the distributed element. As indicated above, the reporting mechanism may send the suspicious activity report via any number of mechanisms, including, but not limited to, a point-to-point connection with the threat management agent, an event notification mechanism, or some other method.

Receiving mechanism 1006 receives messages from the threat management agent. As previously indicated, the messages may be sent via any number of mechanisms, including but not limited to, a point-to-point connection with the threat management agent, an event notification mechanism, or some other method. The receiving mechanism is configured to recognize a deploy countermeasure message, which it will pass to countermeasure deployer 1008 in order to implement the countermeasure as indicated in the message. As discussed above, this can be for a predefined time period or for a time period as indicated in the deploy countermeasure message, until some other event, until specifically directed to discontinue the countermeasure, or some other method of removing the countermeasure is indicated or performed.

Figure 11:
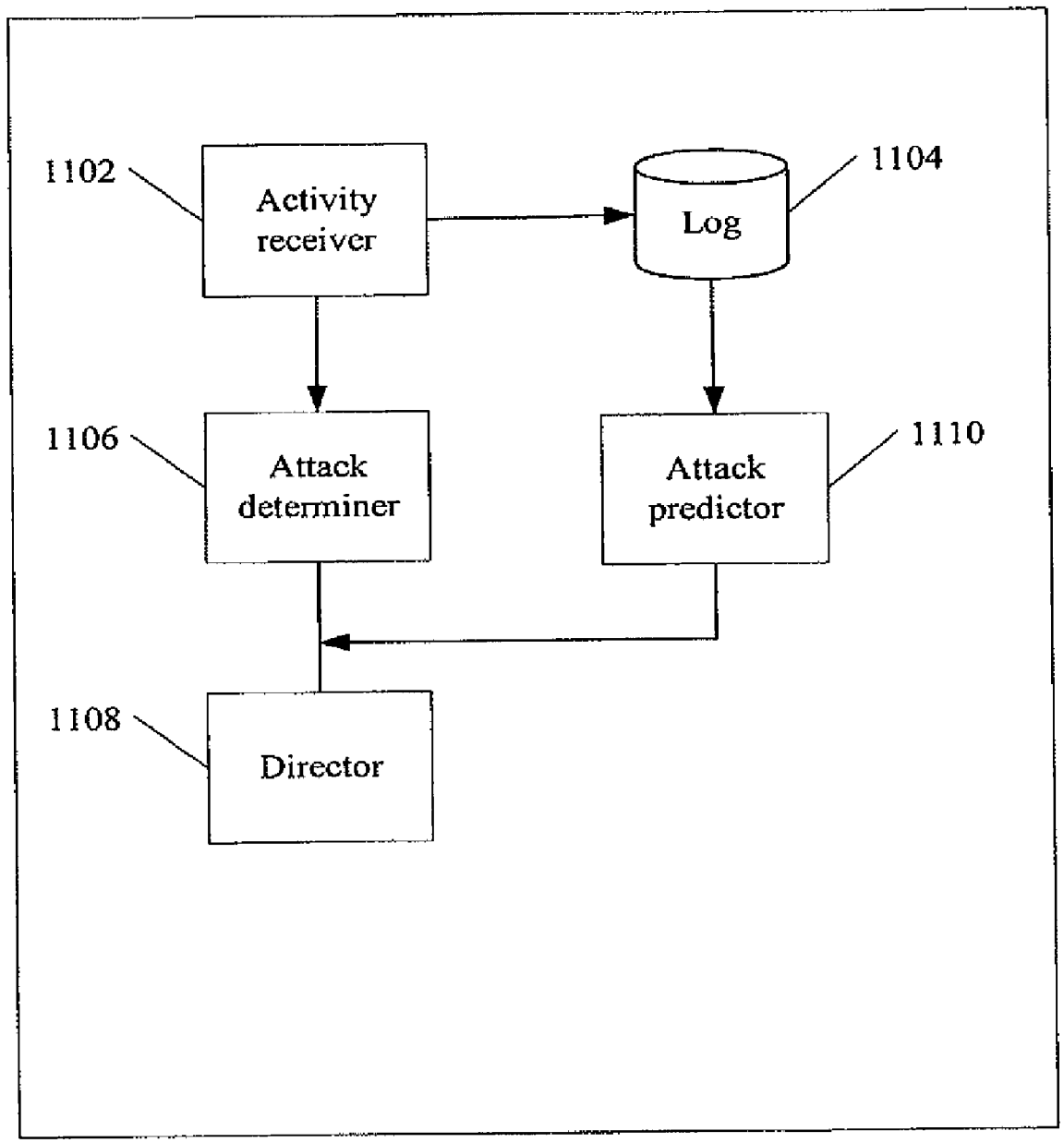
FIG. 11 is a block diagram of the exemplary threat management agent of FIGS. 6-8 or FIG. 9.

FIG. 11 illustrates a functional block diagram for an embodiment of the threat management agent. The blocks in the diagram represent functional entities, and collectively perform the functions outlined previously above. However, in any particular embodiment, either more or fewer functional elements may exist, and the functionality may be partitioned differently than described with respect to the specific embodiment in FIG. 11. All these should be viewed as equivalent. Similarly different embodiments may have more or less functionality that described with respect to the embodiment in FIG. 11. In the particular embodiment in FIG. 11, activity receiver 1102 receives suspicious activity reports from threat sources. Activity receiver 1102 records the reported suspicious activity in a log 1104 and further passes the information from the report to attack determiner 1106, which determines whether an attack is taking place. If an attack is taking place, the attack determiner notifies director 1108 which is responsible for sending a deploy countermeasure message to distributed elements or alternatively, to other threat management agents for distribution to distributed elements. Attack predictor 1110 reviews log 1104 to detect patterns corresponding to an attack, predicts whether an attack will take place and if so, informs director 1108 to send deploy countermeasure messages to the distributed elements or to other threat management agents near the time of the predicted attack.

Alternatively, activity receiver 1102 may pass suspicious activity reports directly to attack predictor 1110, such that attack predictor 1110 may predict a next attack based on reports received in real-time.

In the above embodiments, the functional elements of FIGS. 10 and 11 may be implemented via software, firmware, hardware or a combination of any of these. Further, instructions for configuring a processor to implement an embodiment of the invention may reside on a medium, such as computer memory, floppy disk, or removable optical disk.

The present invention has been described in terms of preferred and exemplary embodiments thereof. Numerous other embodiments, modifications and variations within the scope and spirit of the appended claims will occur to persons of ordinary skill in the art from a review of this disclosure.

We claim as our invention:

1. A method for managing a security threat in a distributed system, comprising:
   configuring a processor to perform the steps of:
   detecting data correlated to suspicious activity in a distributed element of the distributed system; and
   reporting data correlated to the suspicious activity from a distributed element to a threat management agent configured to achieve a coordinated response to the threat;
   determining, by the threat management agent based on an aggregate of data correlated to the suspicious activity received from distributed elements in the distributed system, whether an attack is taking place at least at one distributed element identified by the data correlated to the suspicious activity; and
   deploying a coordinated countermeasure to the attack including a preventive deployment of a countermeasure to at least one distributed element not initially reporting data correlated to suspicious activity, as directed by the threat management agent, based on the attack determination by the threat management agent, within a time window based on the preventive deployment of a countermeasure when a next attack is predicted to occur, wherein the coordinated countermeasure comprises adjustment of at least one distributed element of the distributed system where the data correlated to suspicious activity was not detected.

2. The method of claim 1, wherein the reporting of the data correlated to suspicious activity to the threat management agent includes using a messaging mechanism to send the report.

3. The method of claim 1, wherein
   the deploying of the countermeasure to the attack comprises coordinating the countermeasure among a plurality of threat management agents.

4. The method of claim 1, wherein
   the deploying of the countermeasure to the attack comprises coordinating the countermeasure among distributed elements of the system.

5. The method of claim 1, wherein the determining of whether the attack is taking place comprises determining a level of the data correlated to suspicious activity from at least one level, a different action being associated with each of the level(s).

6. The method of claim 1, wherein the deploying of the countermeasure includes distributing a blacklist to prevent access to at least selective portions of the system from a blacklisted element.

7. A system for managing a security threat in a distributed system, comprising:
   a plurality of distributed elements, including a plurality of distributed threat detection sources, the distributed elements being arranged to send reports of detected data correlated to suspicious activity; and
   a threat management agent device for receiving and reviewing the reports of detected data correlated to suspicious activity from the distributed elements and determining based on an aggregate of data correlated to the suspicious activity received from distributed elements in the distributed system whether an attack is taking place, within a time window based on a preventive deployment of a countermeasure when a next attack is predicted to occur and wherein the threat management agent is configured to achieve a coordinated response to the attack, including directing the countermeasure to be taken when the threat management agent determines that the attack is taking place wherein the coordinated response comprises adjustment of at least one distributed element of the system where suspicious activity was not detected.

8. The system of claim 7, further comprising a point-to-point connection between at least one of the distributed elements and the threat management agent for reporting the detected data correlated to suspicious activity.

9. The system of claim 7, wherein the threat management agent is integrated into existing applications or systems within the system.

10. The system of claim 7, further comprising a plurality of threat management agents distributed within the system, wherein the threat management agents are arranged to deploy the countermeasure by coordinating the countermeasure among the plurality of threat management agents.

11. The system of claim 7, wherein
    the threat management agent is arranged to deploy the countermeasure by coordinating the countermeasure among a plurality of distributed elements of the system.

12. The system of claim 7, wherein the threat management agent is arranged to determine whether the attack is taking place by determining a level of the data correlated to suspicious activity from among at least one level, a different action being associated with each of the level(s).

13. The system of claim 7, wherein when the threat management agent directs a countermeasure be taken by at least one of the distributed elements, the threat management agent is arranged to distribute a blacklist to the distributed element(s) to prevent access to at least selective portions of the system from a blacklisted element.

14. A threat management agent for managing a security threat in a distributed system, the threat management agent comprising:
    an attack predictor device for reviewing reports of suspicious activity, the reports including data correlated to suspicious activity reported from at least one distributed element of the distributed system, and for determining based on an aggregate of data correlated to the suspicious activity received from distributed elements in the distributed system whether a pattern characteristic of an attack occurred within a time window based on a preventive deployment of a countermeasure when a next attack is predicted to occur and for predicting when a next attack is likely to occur based on the detected pattern;
    a director device for directing coordinated deployment of a countermeasure to the predicted next attack, in a time window based on when the next attack is predicted to occur, wherein the coordinated countermeasure comprises adjustment of at least one distributed element of the distributed system where data correlated to suspicious activity was not detected.

15. The threat management agent of claim 14, wherein the attack predictor is configured, such that at least some of the reports to be reviewed by the attack predictor are in a log of data correlated to suspicious activity reports.

16. The threat management agent of claim 14, wherein the director is further for coordinating the countermeasure among a plurality of threat management agents.

17. The threat management agent of claim 14, wherein the director is further for coordinating the countermeasure among distributed elements of the distributed system.

18. A distributed element of a system for managing a security threat, the distributed element comprising:
   a threat detection mechanism for detecting suspicious activity and for reporting the data correlated to suspicious activity to a threat management agent;
   a countermeasure deployer device for deploying a countermeasure responsive to receiving a message from the threat management agent directing that the countermeasure be activated, the threat management agent configured to receive and review reports of data correlated to suspicious activity from at least one other distributed element within a time window based on deploying a countermeasure responsive to receiving a message from the threat management agent and to determine, by the threat management agent based on an aggregate of data correlated to the suspicious activity received from distributed elements in the system whether an attack is taking place based on the data correlated to suspicious activity and to achieve a coordinated response to the threat including a preventive deployment of a countermeasure to at least one distributed element not initially reporting data correlated to suspicious activity, as directed by the threat management agent, based on the attack determination by the threat management agent, within a time window based on the preventive deployment of a countermeasure when a next attack is predicted to occur, wherein the coordinated response comprises adjustment of at least one distributed element of the system where suspicious activity was not detected.

19. A machine-readable storage medium having instructions recorded thereon, such that when the instructions are read and executed by a processor, the processor is configured to perform the functions of:
   detecting data correlated to suspicious activity in a distributed element of a distributed system; and
   reporting data correlated to the suspicious activity from a distributed element to a threat management agent configured to achieve a coordinated response to the threat;
   determining, by the threat management agent based on an aggregate of data correlated to the suspicious activity received from distributed elements in the distributed system, whether an attack is taking place at least at one distributed element identified by the data correlated to the suspicious activity; and
   deploying a coordinated countermeasure to the attack including a preventive deployment of a countermeasure to at least one distributed element not initially reporting data correlated to suspicious activity, as directed by the threat management agent, based on the attack determination by the threat management agent, within a time window based on the preventive deployment of a countermeasure when a next attack is predicted to occur, wherein the coordinated countermeasure comprises adjustment of at least one distributed element of the distributed system where the data correlated to suspicious activity was not detected.

20. The machine-readable medium of claim 19, wherein the determining of whether an attack is taking place comprises determining a level of data correlated to suspicious activity from among at least one level, a different action being associated with each of the level(s).

21. The machine-readable medium of claim 19, wherein when the processor directs deployment of the countermeasure, the processor directs distribution of a blacklist to distributed elements of the system to prevent access at least to selective portions of the system from a blacklisted element.

22. A threat management agent for managing, a first instance of a security threat in a distributed system located within a larger interconnected enterprise system, the threat management agent comprising:
   a local activity receiver for receiving, by a processor, reports of suspicious activity from a distributed element of the system relating to a first instance of a security threat;
   a local attack determiner for determining whether an attack is taking place based on data correlated to suspicious activity reports from a distributed element of the system relating to a first instance of a security threat;
   a communication broadcaster for broadcasting a determination based on an aggregate of reports of suspicious activity from a distributed element of the system relating to a first instance of a security threat in a distributed system to other threat management agents operating within the interconnected enterprise system for evaluation and determination of the first instance of a security threat in a distributed system, further comprising:
   a non-local activity receiver for receiving, by a processor, reports from the communication broadcaster of a first instance of a suspicious activity from a non-local distributed element;
   a non-local attack determiner device for determining based on an aggregate of data correlated to the suspicious activity received from distributed elements in the system within a time window based on deploying a countermeasure responsive to receiving a message from the threat management agent and to determine whether an attack is taking place based on data correlated to suspicious activity reports; and
   a non-local director for directing a deployment of a coordinated countermeasure to the attack be performed, wherein the coordinated countermeasure comprises any further coordination based on the communication of other activity received from other threat management agents; and
   a director for directing that a deployment of a coordinated countermeasure to the attack be performed including a preventive deployment of a countermeasure to at least one distributed element not initially reporting data correlated to suspicious activity, as directed by the threat management agent, based on the attack determination by the threat management agent, within a time window based on the preventive deployment of a countermeasure when a next attack is predicted to occur, wherein the coordinated countermeasure comprises adjustment of at least one distributed element of the system where the data correlated to suspicious activity was not detected.

* * * * *